(12) United States Patent
Kinjo

(10) Patent No.: US 6,529,630 B1
(45) Date of Patent: Mar. 4, 2003

(54) METHOD AND DEVICE FOR EXTRACTING PRINCIPAL IMAGE SUBJECTS

(75) Inventor: Naoto Kinjo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/260,516

(22) Filed: Mar. 2, 1999

(30) Foreign Application Priority Data

Mar. 2, 1998 (JP) .......................................... 10-049379
Mar. 10, 1998 (JP) .......................................... 10-057854

(51) Int. Cl.$^7$ ................................................. G06K 9/66
(52) U.S. Cl. ...................... 382/190; 382/118; 382/195; 382/203
(58) Field of Search ................................ 382/115, 117, 382/118, 173, 199, 203, 190, 195

(56) References Cited

U.S. PATENT DOCUMENTS 5,715,325 A * 2/1998 Bang et al. .................. 382/118
6,108,437 A * 8/2000 Lin .............................. 382/118

FOREIGN PATENT DOCUMENTS

JP          8-184925        7/1996
JP          10-200671       7/1998

* cited by examiner

Primary Examiner—Thomas D. Lee

(57) ABSTRACT

The method for extracting a principal image subject performs a plurality of subject extractions having different characteristics, synthesizes extracted subjects and extracts the principal image subject from a result of a synthesis if it satisfies a specified criterion of judgment, but if it does not satisfy, further performs an auxiliary image subject extraction having a different characteristic and extracts the principal image subject using the result of the synthesis and a result of extraction by the auxiliary image subject extraction. The device for extracting a principal image subject has a cascaded extracting units at least one of which comprises a plurality of extracting subunits processed in parallel and a condition evaluating section for evaluating conditions the subject extractions based on results in the respective subunits. The method and device can be used with photoprinters, both digital and analog alike, and yet principal image subjects can be extracted in high precision and with satisfactory efficiency in response to diverse states of images and principal subjects.

18 Claims, 5 Drawing Sheets

METHOD AND DEVICE FOR EXTRACTING PRINCIPAL IMAGE SUBJECTS

BACKGROUND OF THE INVENTION

This invention relates to the technical field of a method and a device for extracting principal subjects from film recorded images and other original images which are suitable for use with photoprinters and otherwise.

Heretofore, the images recorded on photographic films such as negatives and reversals (which are hereunder referred to simply as "films") have been commonly printed on light-sensitive materials (photographic paper) by means of direct (analog) exposure in which the film image is projected onto the light-sensitive material to achieve its areal exposure.

A new technology has recently been introduced and this is a printer that relies upon digital exposure. Briefly, the image recorded on a film is read photoelectrically, converted to digital signals and subjected to various image processing operations to produce image data for recording purposes; recording light that has been modulated in accordance with the image data is used to scan and expose a light-sensitive material to record a latent image, which is subsequently developed to produce a (finished) print. The printer operating on this principle has been commercialized as a digital photoprinter.

In the digital photoprinter, images can be processed as digital image data to determine the exposing conditions for printing; therefore, the digital photoprinter is capable of performing effective image processing operations such as the correction of washed-out highlights or flat shadows due to the taking of pictures with backlight or an electronic flash, sharpening and the correction of color or density failures and this enables the production of high-quality prints that reproduce images of the quality that has been impossible to achieve by the conventional direct exposure technique. In addition, not only the assembling of images and the splitting of a single image into plural images but also the compositing of characters can be performed by processing the image data and, as a result, prints can be outputted after various editing and/or processing operations have been performed in accordance with specific uses. Outputting images as prints (photographs) is not the sole capability of the digital photoprinter; the image data can be supplied into a computer or the like and stored in recording media such as a floppy disk; hence, the image data can be put to various non-photographic uses.

Having these features, the digital photoprinter is basically composed of an image input unit and an image output unit. The image input unit has a scanner (image reading apparatus) that reads the image on a film photoelectrically and an image processing apparatus that processes the captured image to produce output image data. The image output unit has a printer (image recording apparatus that records a latent image on a light-sensitive material by scan exposing it in accordance with the image data supplied from the image input unit and a processor (developing apparatus) that performs development and other necessary processing on the exposed light-sensitive material to produce a print.

In the scanner, reading light issuing from a light source is allowed to be incident on a film, from which projected light bearing the image recorded on the film is produced and focused by an imaging lens to form a sharp image on an image sensor such as a CCD sensor; the image is then captured by photoelectric conversion and sent to the image processing apparatus as data for the image on the film (as image data signals) after being optionally subjected to various image processing steps.

In the image processing apparatus, image processing conditions are set on the basis of the image data captured with the scanner and image processing as determined by the thus set conditions is performed on the captured image data and the resulting output image data for image recording (i.e., exposing conditions) are sent to the printer.

In the printer, if it is of a type that relies upon exposure by scanning with an optical beam, the latter is modulated in accordance with the image data sent from the image processing apparatus and deflected in a main scanning direction as the light-sensitive material is transported in an auxiliary scanning direction perpendicular to the main scanning direction, whereby a latent image is formed as the result of exposure (printing) of the light-sensitive material with the image bearing optical beam. In the processor, development and other processing as determined by the light-sensitive material are performed to produce a print (photograph) reproducing the image that was recorded on the film.

If the original image contains a human individual, his or her face is the most important element of processing with photoprinters whether they are digital or of the conventional analog type (the two types are hereinafter collectively referred to as "photoprinters") and the quality and evaluation of the reproduced image, or print, are greatly affected by how beautifully the face of the human individual is finished.

To deal with this problem, the conventional photoprinters extract the face (face region) of a human individual from the image on a film and determines exposing conditions that enable the face to be finished in the desired way. In the case of a digital photoprinter, such exposing conditions are image processing conditions for producing output image data and in the case of an analog photoprinter, they are exemplified by the amount of exposing light and the amounts by which color filters are to be inserted.

Particularly in the case of a digital photoprinter which is capable of very flexible image processing through the processing of image data, the information on the face is important for setting image-dependent optimal image processing conditions and performing the appropriate face extraction is the way that enables high-quality prints to be produced in a more consistent manner.

Under these circumstances, various methods of subject extraction have so far been proposed for extracting various kinds of principal image subjects. To mention a few examples, skin color extraction using the color hues and saturations of an image and contour extraction by detecting the edge portions of an image are known.

However, the state of the images on films varies with the conditions under which the images were taken, such as whether they were shot with an electronic flash or backlight, or whether the films were overexposed or underexposed or whether color failure occurred. Hence, no single method of extraction that has been proposed to date is capable of ensuring consistent and precise face extraction from various states of images. The precision of face extraction can be improved by combining a plurality of methods of extracting image subjects. However, in order to perform consistent and precise face extraction from various states of images, many methods of extraction have to be combined and the time of performing the necessary processing and calculations to extract the desired principal image subject will inevitably increase to cause undesired effects such as the decrease in the efficiency of print production.

As already mentioned, the state of the images on films varies with the conditions under which the images were taken, such as whether they were shot with an electronic flash or backlight. In addition, the state of the principal subject in a particular image such as its size and orientation also varies with the image, particularly the scene in it.

In ordinary photoprinters, the subject of an image is extracted by many methods searching in four directions through the image and the results of extraction by the respective methods are combined to extract (and evaluate) the principal subject of the image, thereby ensuring that the principal image subject can be extracted with satisfactory precision from many and diverse images.

However, this requires a prolonged time to extract the desired principal image subject, which is one of the reasons for the lower efficiency of print production. A further problem with the use of many methods in extracting the principal image subject is that if several methods fail to extract the correct principal subject, the quality of the final image is adversely affected rather than being improved.

SUMMARY OF THE INVENTION

The present invention has been accomplished under these circumstances and has as a first object providing a method for extracting principal image subjects which, when used with digital and analog photoprinters alike, can extract the intended principal image subject with high precision and satisfactory efficiency from various states of images.

Second object of the invention is to provide a device for implementing the above method.

Third object of the invention is to provide a method for extracting principal image subjects which, when used with digital and analog photoprinters alike, can extract the principal image subjects from various states of images and principal subjects with satisfactory efficiency and precision, and further achieve an improvement in the efficiency of print production.

The first object of the invention can be attained by its first aspect which is a method for extracting a principal image subject comprising the steps of:

performing a plurality of subject extractions having different characteristics;

synthesizing subjects extracted by the respective subject extractions; and extracting the principal image subject from a result of a synthesis if the result of said synthesis satisfies a specified criterion of judgment; but if the result of said synthesis does not satisfy the criterion of judgment, performing an auxiliary image subject extraction having a different characteristic after said synthesizing and extracting the principal image subject using the result of said synthesis and a result of extraction by said auxiliary image subject extraction.

In a preferred embodiment, said criterion of judgment is at least one of a degree of overlap between regions that occurs when the subjects extracted by the respective subject extractions are synthesized and a weighting score applied when the subjects extracted by the respective subject extractions are synthesized.

If, in case of extracting the principal image subject from the result of said synthesis, an image characteristic quantity of the extracted principal image subject exceeds a predetermined threshold, said auxiliary image subject extraction is performed and the principal image subject is extracted using the result of said synthesis and the result of extraction by said auxiliary image subject extraction.

Further, if, in case of extracting the principal image subject from the result of said synthesis, more than one principal image subject are extracted and if the image characteristic quantity of said more than one principal image subject has differences in excess of a specified level, said auxiliary image subject extraction is performed and the principal image subject is extracted using the result of extraction by said auxiliary image subject extraction.

In another preferred embodiment, said subject extractions are at least two operations selected from among skin color extraction, face contour extraction and circular shape extraction, and said auxiliary image subject extraction is at least one operation selected from among hairs-on-head extraction, face's internal structure extraction, body extraction, non-background extraction and circular shape extraction.

The second object of the present invention can be attained by its second aspect which is a device for extracting a principal image subject, comprising:

a plurality of extracting units which are cascaded and at least one of which comprises:

a plurality of extracting subunits which are processed in parallel and which perform subject extractions having different characteristics; and a condition evaluating section which evaluates conditions for said subject extractions based on results in the respective extracting subunits; and wherein said condition evaluating section performs weighting on respective extracting regions of subjects extracted by said extracting subunits, and/or evaluation of appropriateness of said subjects, as well as selection of at least one of said extracting units which is located downstream and to which extraction processing is applied based on the results thereof.

Preferably, said extracting units comprise at least one unit which has one extracting subunit performing one subject extraction and the condition evaluating section which evaluates the condition for said subject extraction based on the results in the extracting subunit, or at least one unit which has no extracting subunit but only the condition evaluating section which evaluates the conditions for the extracted subjects based on the results in the cascaded precedent extracting unit.

Preferably, said extracting subunits comprises at least one section selected from the group consisting of a skin color extracting section, a face contour extracting section, a circular shape extracting section, a body extracting section, an eye extracting section, a face's internal structure extracting section, a hairs-on-head extracting section and a non-background extracting section, as well as an extracting section for performing at least two of a skin color extraction, a face contour extraction, a circular shape extraction, a body extraction, an eye extraction, a face's internal structure extraction, a hairs-on-head extraction and non-background extraction.

Preferably, said condition evaluating section comprises a synthesis/result evaluating section which synthesizes candidate subjects having different characteristics as extracted in the plurality of extracting subunits processed in parallel, and which judges whether the results of the subject extractions are appropriate or not based on the extracting regions of said synthesized candidate subjects.

Preferably, the condition evaluating section in the last one of the cascaded extracting units is a principal image subject evaluating section for extracting the principal image subject.

Moreover, the present invention also provides a method for extracting a principal image subject, comprising:

a plurality of extracting steps which are cascaded, at least one of said-plurality of extracting steps comprising:

a plurality of extracting substeps processed in parallel for performing subject extractions having different characteristics; and a condition evaluating substep for evaluating conditions for said subject extractions based on results in the respective extracting substeps; and wherein said condition evaluating substep is performing weighting on respective extracting regions of subjects extracted in said extracting substeps, and/or evaluation of appropriateness of said subjects, as well as selection of at least one of said extracting steps which is located downstream and to which extraction processing is applied based on the results thereof.

Preferably, said plurality of extracting steps contain at least one step which has one extracting substep performing one subject extraction and the condition evaluating substep which evaluates the conditions for said subject extraction based on the results in the extracting substep, or at least one step which has no extracting substep but only the condition evaluating substep which evaluates the conditions for the extracted subjects based on the results in the cascaded precedent extracting step.

Preferably, said extracting substeps comprise at least one selected from the group consisting of skin color extracting, face contour extracting, a circular shape extracting, body extracting, eye extracting, face's internal structure extracting, hairs-on-head extracting, non-background extracting and extraction for performing at least two thereof.

Preferably, said condition evaluating substep comprises synthesis/result evaluating substep synthesizing candidate subjects having different characteristics as extracted in the plurality of extracting substeps processed in parallel, and judging whether the results of the subject extractions are appropriate or not based on the extracting regions of said synthesized candidate subjects.

Preferably, the condition evaluating substep in the last one of the cascaded extracting steps is a principal image subject evaluating substep for extracting the principal image subject.

The third object of the invention can be attained by its third aspect which is a method of extracting a principal image subject, comprising the steps of:

preliminarily classifying a state of a principal subject in an image into a plurality of types;

setting an appropriate parameter for the extraction of the principal subject for each state of the principal subjects;

evaluating the similarity between two images; and, if similarity is found to exist between the image from which the principal subject is to be extracted and the image from which the principal subject has already been extracted, extracting the principal subject using a parameter for the extraction of the principal subject that corresponds to the state of the principal subject in the image that has already been subjected to the extraction of the principal subject.

In a preferred embodiment, the state of the principal subject in said image is at least one element of the group consisting of size, orientation, position in the image, color distribution and density distribution.

The third object of the invention can also be attained by its fourth aspect which is a method of extracting a principal image subject, comprising the steps of:

extracting a principal subject from an image;

using luminance data on shooting of the image to determine luminance relationship between a region containing the extracted principal subject and its surrounding region, as well as density relationship between the region containing the extracted principal subject and the surrounding region; and judging for the match between said luminance and density relationships to see if a result of extracting said principal subject is appropriate or not.

If, in the case where an already processed image has been given a special treatment such as color/density adjustment, correction for the light source, one of various enhancement steps and red eye correction in response to an operator's command, the current image to be processed resembles said processed image, the former is preferably subjected to a similar or comparable special treatment.

DETAILED DESCRIPTION OF THE INVENTION

The method and device of the invention for extracting principal image subjects are now described in detail with reference to the preferred embodiment shown in the accompanying drawings.

Figure 1:
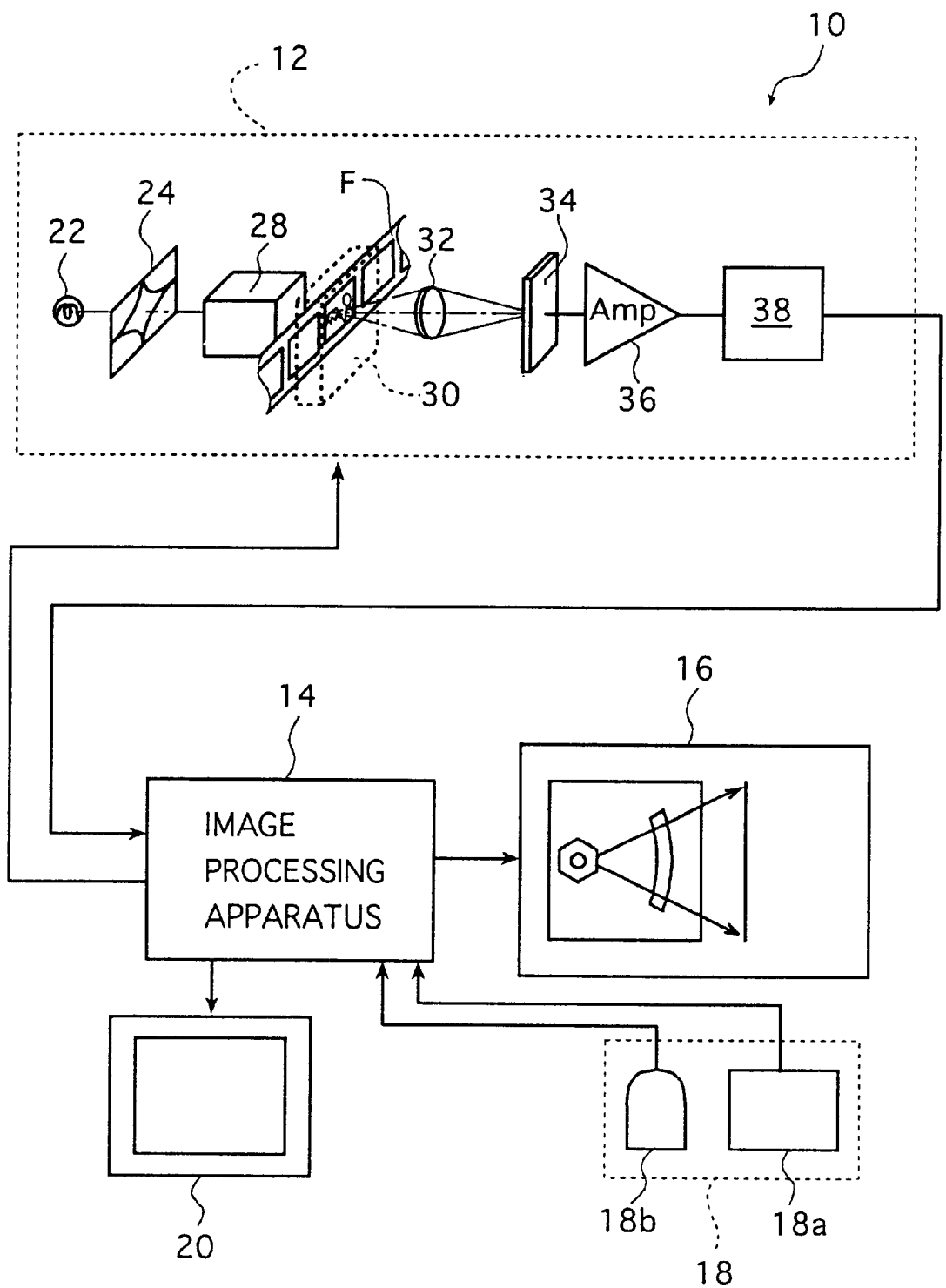
FIG. 1 is a block diagram of a digital photoprinter using an embodiment of the method and device of the invention for extracting principal image subjects.

FIG. 1 is a block diagram of an exemplary digital photoprinter using the method and device of the invention for extracting principal image subjects. The digital photoprinter shown in FIG. 1 (which is hereunder referred to simply as "photoprinter 10") comprises basically a scanner (image reading apparatus) 12 for photoelectrically reading the image recorded on a film F, an image processing apparatus 14 which performs image processing on the thus read image data (image information) and with which the photoprinter 10 as a whole is manipulated and controlled, and a printer 16 which performs imagewise exposure of a light-sensitive material (photographic paper) with light beams modulated in accordance with the image data delivered from the image processing apparatus 14 and which performs development and other necessary processing to produce a (finished) print.

Connected to the image processing apparatus 14 are a manipulating unit 18 having a keyboard 18a and a mouse 18b for inputting (setting) various conditions, selecting and commanding a specific processing step and entering a command and so forth for effecting color/density correction, as well as a display 20 for representing the image captured with the scanner 12, various manipulative commands and pictures for setting and registering various conditions.

It should be noted that the applicability of the method and device of the invention for extracting principal image subjects is not limited to the digital photoprinter described above; it is also applicable with advantage to the conventional analog photoprinter relying upon direct exposure in which the image recorded on a film is read photoelectrically, exposing conditions (image processing conditions) such as the value by which the variable diaphragm should be stopped down for adjusting the quantity of exposing light and the amounts by which color filters should be inserted for color adjustment are determined on the basis of the obtained image data, and the light being incident on the film (or the projected light from the film) is adjusted to expose the light-sensitive material with the projected light.

The scanner 12 is an apparatus with which the images recorded on the film F are read photoelectrically frame by frame. It comprises a light source 22, a variable diaphragm 24, a diffuser box 28 which diffuses the reading light incident on the film F so that it becomes uniform across the plane of the film F, an imaging lens unit 32, an image sensor 34 having line CCD sensors capable of reading R (red), G (green) and B (blue) images, an amplifier (Amp) 36 and an A/D (analog/digital) converter 38.

In the photoprinter 10, dedicated carriers are available that can be loaded into the housing of the scanner 12 in accordance with the type of the film used (e.g. whether it is a film of the Advanced Photo System or a negative or reversal film of 135 size), the format of the film (e.g., whether it is a strip or a slide) or other factor. By replacing one carrier with another, the photoprinter 10 can be adapted to process various kinds of films in various modes. The images (frames) that are recorded on the film and which are subjected to the necessary procedure for print production are transported to and held in a specified reading position by means of the carriers.

The scanner 12 captures the images recorded on the film F in the following manner; the reading light from the light source 22 has its quantity adjusted by means of the variable diaphragm 24 and is incident on the film F held in the specified reading position by means of the carrier and thereafter passes through the film F to produce projected light bearing the image recorded on it.

Figure 2A:
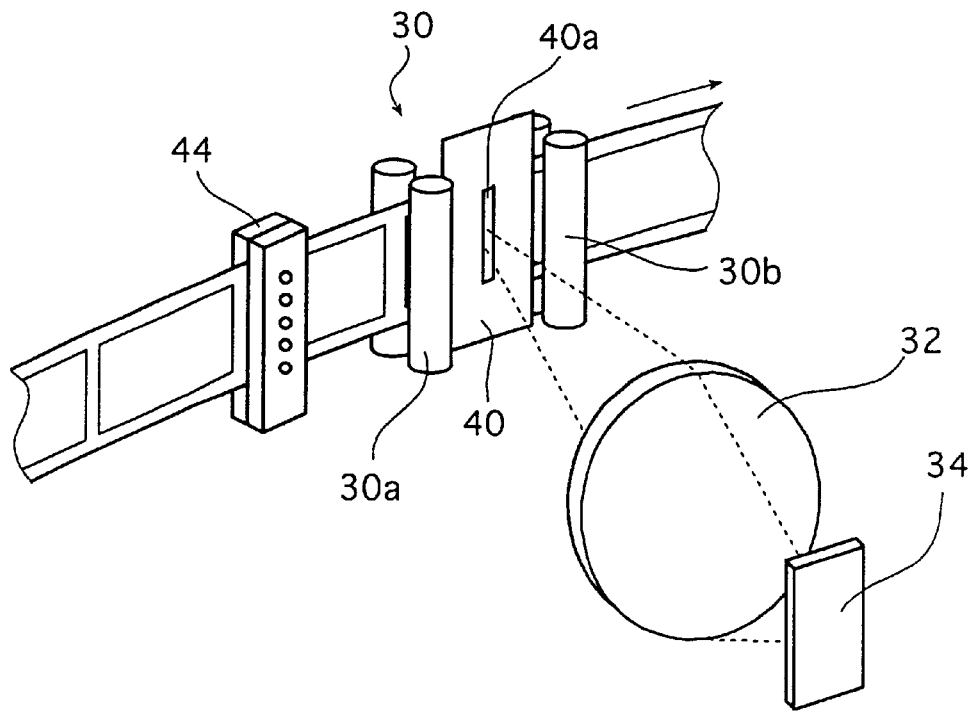
FIG. 2A is a schematic perspective view for illustrating a carrier to be installed in the digital photoprinter shown in FIG. 1.

As shown schematically in FIG. 2A, the illustrated carrier 30 has a pair of transport roller pairs 30a and 30b and a mask 40 having a slit 40a. The transport rollers 30a and 30b are provided on opposite sides of the specified reading position in an auxiliary scanning direction which is perpendicular to the main scanning direction (i.e., the direction in which the line CCD sensors in the image sensor 34 extend) and they transport the film F with its length being parallel to the auxiliary scanning direction as it is in registry with the reading position. The slit 40a defines the projected light from the film F to have a specified narrow shape, is in registry with the reading position and extends in the main scanning direction.

Being held in registry with the reading position, the film F is transported in the auxiliary scanning direction by means of the carrier 30 as it is illuminated with the reading light. Consequently, the film F is subjected to two-dimensional slit scan with the reading light passing through the slit 40a extending in the main scanning direction, whereupon the image of each frame recorded on the film F is captured.

Reference numeral 44 is a code reader for reading various bar codes such as the DX code, expanded DX code and FNS code that are recorded optically on the film.

Magnetic recording media are formed on films of the Advanced Photo System. Carriers adaptive to films of the Advanced Photo System (or their cartridges) are equipped with magnetic heads that read the information recorded on the magnetic recording media and which write necessary information to the media. During image capturing from the film F, the magnetic heads read relevant magnetic information and the necessary information is sent from the scanner 12 to the image processing apparatus 14.

Figure 2B:
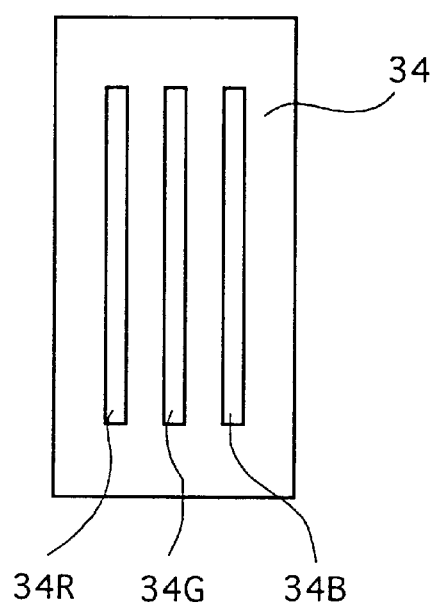
FIG. 2B is a conceptual view of an image sensor in the digital photoprinter shown in FIG. 1.

As already mentioned, the reading light passes through the film F held on the carrier 30 and the resulting image-bearing, projected light is focused by the imaging lens unit 32 to form a sharp image on the light-receiving plane of the image sensor 34. As shown in FIG. 2B, the image sensor 34 is a 3-line color CCD sensor comprising a line CCD sensor 34R for reading R image, a line CCD sensor 34G for reading G image, and a line CCD sensor 34B for reading B image. As already mentioned, the respective line CCD sensors extend in the main scanning direction. The projected light from the film F is separated into three primary colors R, G and B and captured photoelectrically by means of the image sensor 34.

The output signals from the image sensor 34 are amplified with the amplifier 36, converted to digital form in the A/D converter 38 and sent to the image processing apparatus 14.

In the scanner 12, the images recorded on the film F are captured by two scans, the first being prescan at low resolution and the second being fine scan for obtaining output image data. Prescan is performed under preset reading conditions that ensure that the images on all films to be handled by the scanner 12 can be read without saturating the image sensor 34. Fine scan uses the prescanned data and is performed under reading conditions that are set for each frame such that the image sensor 34 is saturated at a slightly lower density than the minimum density of the image (frame) of interest. The output signals for prescan and fine scan are essentially the same data except for resolution and output level.

It should be noted that the scanner to be used in the photoprinter using the method and device of the invention for extracting principal image subjects is by no means limited to a type that relies upon the slit scan capturing described above but that it may be of a type that relies upon areal capturing, or a technique by which the entire surface of the image in one frame is illuminated with the reading light for capturing the image at a time. In this alternative approach, an area CCD sensor may be used with means of inserting R, G and B color filters being provided between the light source and the film F. Image capturing with the area CCD sensor is performed with R, G and B color filters being sequentially inserted to color separate the image recorded on the film.

As already mentioned, the digital signals output from the scanner 12 are fed into the image processing apparatus 14 (which is hereinafter referred to as "processing apparatus 14").

Figure 3:
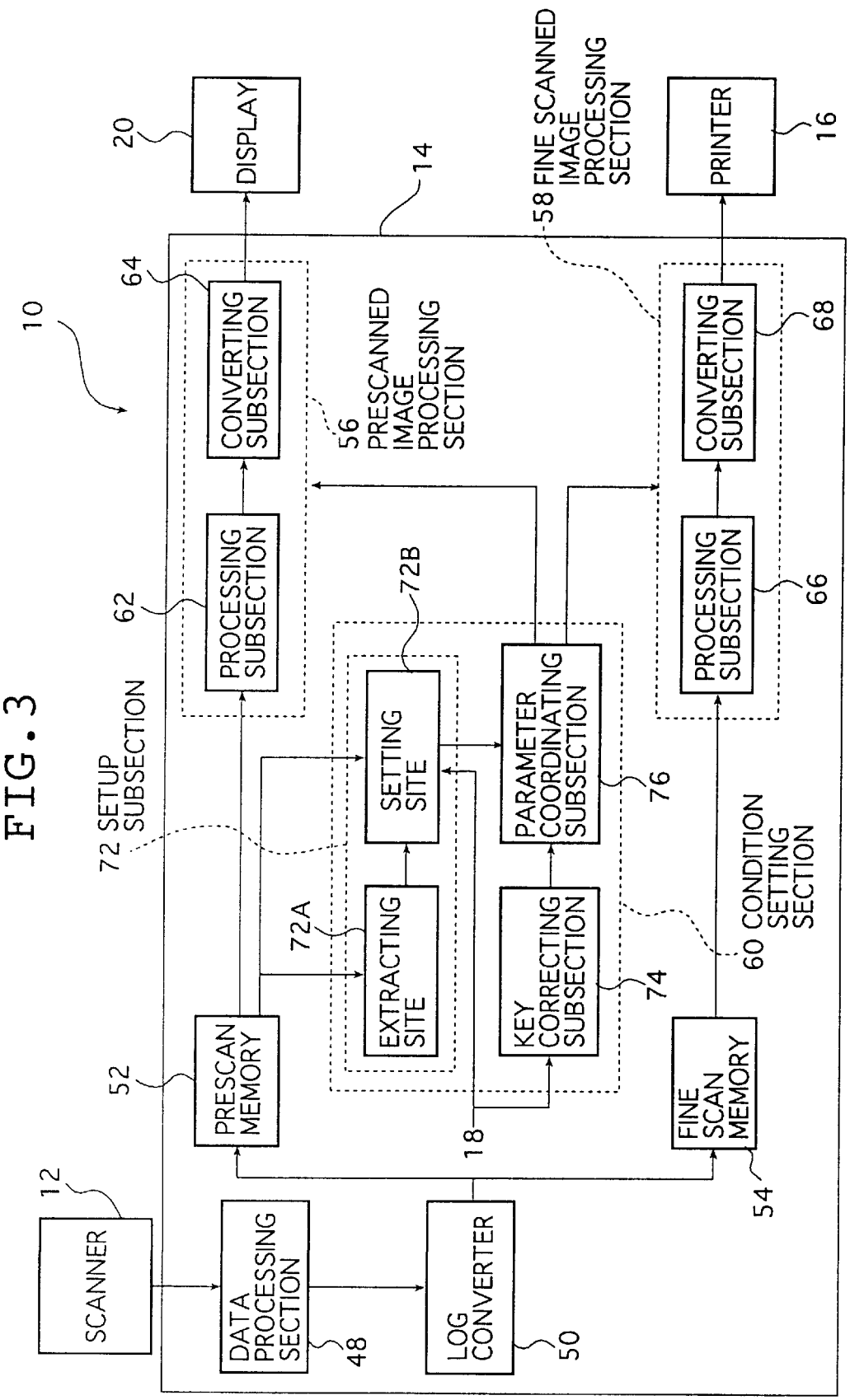
FIG. 3 is a block diagram of an image processing apparatus in the digital photoprinter shown in FIG. 1.

FIG. 3 is a block diagram of the processing apparatus 14, which comprises a data processing section 48, a log converter 50, a prescan (frame) memory 52, a fine scan (frame) memory 54, a prescanned image processing section 56, a fine scanned image processing section 58, and a condition setting section 60.

FIG. 3 shows only the parts related to image processing and besides these parts, the processing apparatus 14 includes a CPU for controlling and managing the overall operation of the photoprinter 10 including the processing apparatus 14, memories for storing the information necessary for the operation and otherwise of the photoprinter 10. The manipulating unit 18 and the display 20 are connected to related parts via the CPU and the like (CPU bus).

The R, G and B digital signals output from the scanner 12 are sent to the data processing section 48, where they are subjected to specified data processing steps such as dark correction, defective image correction and shaing correction. Thereafter, the processed digital signals are transferred into the log converter 50, where they are converted to digital form (density data), of which prescanned data is stored in the prescan memory 52 and fine scanned data is stored in the fine scan memory 54.

The prescanned data stored in the prescan memory 52 is read into the prescanned image processing section 56 having an image data processing subsection 62 (hereinafter referred to as "processing subsection 62") and an image data converting subsection 64 whereas the fine scanned data stored in the fine scan memory 54 is read into the fine scanned image processing section 58 having an image data processing subsection 66 (hereinafter referred to as "processing subsection 66") and an image data converting subsection 68.

The processing subsection 62 in the prescanned image processing section 56 and the processing subsection 66 in the fine scanned image processing section 58 are the sites where the image (image data) captured with the scanner 12 is subjected to specified image processing steps in accordance with the conditions that are set by means of the condition setting section 60 to be described later in this specification. The two processing subsections 62 and 66 perform basically the same processing except for resolution.

The image processing steps to be performed by the processing subsections 62 and 66 are not limited to any particular types and may be exemplified by various known image processing steps in the art. Examples include gray balance adjustment, tonal correction and density (lightness) adjustment that are performed using LUTs (look-up tables), as well as correction for the kind of light source used in taking the picture and the saturation adjustment (color adjustment) of the image that are performed by matrix (MTX) operations. Other examples are electronic magnification, dodging (compressing/extending the density's dynamic range) and sharpening; these steps are performed using a low-pass filter, an adder, LUTs, MTXs and so forth, or by averaging, interpolation and other means that use appropriate combinations of those devices.

The conditions for the above-mentioned image processing steps are set in the condition setting section 60 (to be described below) using the prescanned data.

The image data converting subsection 68 is a site where the image data processed by the processing subsection 66 is converted with a 3D (three-dimensional) LUT or the like into image data that is subsequently supplied into the printer 16 as image data corresponding to image recording with the printer 16.

The image data converting subsection 64 optionally thins out the image data processed by the processing subsection 62 and similarly converts the thinned out image data with a 3D-LUT or the like into image data that corresponds to the representation on the display 20 and which is subsequently supplied to the display 20.

The conditions for the processing to be done in the two image data converting subsections 64 and 68 are set in the condition setting section 60 (which is described below) using the prescanned data.

The condition setting section 60 sets the conditions for the various image processing steps to be done in the prescanned image processing section 56 and the fine scanned image processing section 58. It also sets the reading conditions for fine scan. The condition setting section 60 comprises a setup subsection 72, a key correcting subsection 74 and a parameter coordinating subsection 76.

The setup subsection 72 has a principal part extracting site 72A (hereinafter referred to as "extracting site 72A") for extracting the principal part of the image (the principal image subject) using the prescanned data and a setting site 72B which, in response to the information about the principal part extracted by the extracting site 72A, the prescanned data and an optionally entered operator command, sets the reading conditions for fine scan and supplies them to the scanner 12; in addition, the setting site 72B constructs (or calculates) the conditions for the image processing steps to be done in the prescanned image processing section 56 and the fine scanned image processing section 58 and supplies them to the parameter coordinating subsection 76.

Figure 4:
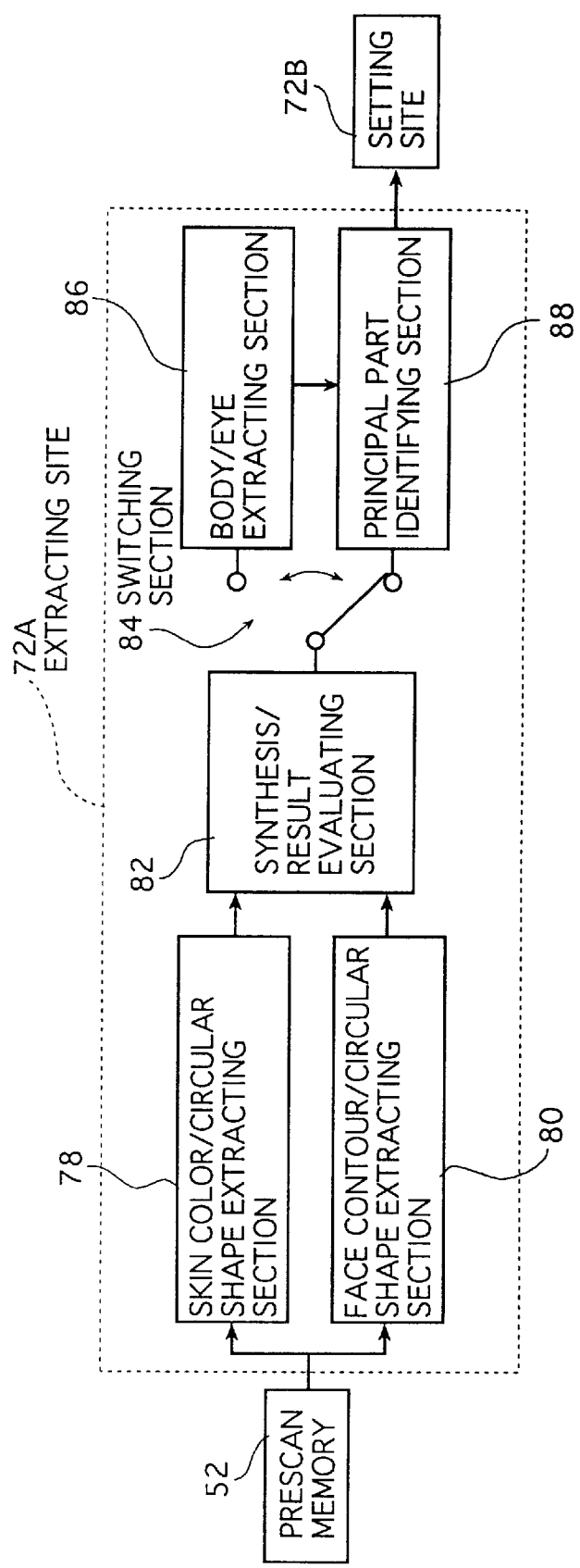
FIG. 4 is a block diagram of an extracting site in the image processing apparatus shown in FIG. 3.

The extracting site 72A constitutes the device of the second aspect of the invention for extracting principal image subjects which implements the method for extracting principal image subjects according to the first aspect of the present invention. FIG. 4 shows a block diagram of an example of the extracting site 72A which is the device of the invention for extracting principal image subjects implementing the method of the invention for extracting a human face as the principal part or principal image subject. This is not however the sole example of the invention. As shown, the extracting site 72A comprises a skin color/circular shape extracting section 78, a face contour/circular shape extracting section 80, a synthesis/result evaluating section 82, a switching section 84, a body/eye extracting section 86 and a principal part identifying section 88.

The skin color/circular shape extracting section 78 performs skin color and circular shape extractions to extract the face region as the principal part of an image. Stated more specifically, the skin color/circular shape extracting section 78 detects the hues and saturations of individual pixels from the prescanned data (the data may optionally be thinned out) and extracts a region of pixels (a skin color region) that are estimated to represent a skin color corresponding to the human skin. Human faces are generally elliptical so the skin color/circular shape extracting section 78 then bases on the extracted skin color region to extract an elliptical or circular shape that is estimated to represent the human face and designates it as a candidate face region.

The face contour/circular shape extracting section 80 performs edge and circular shape extractions to extract the face region as the principal part of an image. Stated more specifically, the face contour/circular shape extracting section 80 first binarizes the prescanned data (the data may optionally be thinned out) with reference to a specified threshold density and divides the image of interest into two regions, one being composed of pixels of lower densities than the threshold (if the film F is a negative, this region comes out as a high-density area on the output print and, hence, it is hereunder referred to as a "black region") and the other being composed of pixels of higher densities than the threshold (for the same reason as set forth above, this region is hereunder referred to as a "white region"). Then, the face contour/circular shape extracting section 80 traces the contours of the black and white regions, calculates the curvatures of the contours and extracts concave and convex areas. Alternatively, the face contour/circular shape extracting section 80 may perform edge detection by differential filtering, binarize the detected edges with reference to a specified threshold density and trace the contours on the basis of the binarized edges.

Subsequently, on the basis of the lines of the traced contours, the face contour/circular shape extracting section 80 determines the lengths of the lines, their curvatures and the concave and convex areas they have. In addition, on the basis of the symmetry of those lines with others, the face contour/circular shape extracting section 80 extracts lines (specified lines) that are estimated to represent sides of the human face and set the axis of symmetry of a pair of symmetrical specified lines. Then, on the basis of the ratio of the distance between corresponding lines to their length (aspect ratio) and the similarity of lines in rotation symmetry as determined from the image data, binarized data and so forth, the face contour/circular shape extracting section 80 extracts lines (hypothetical lines) that can be assumed to form both sides of the human face.

Further, the face contour/circular shape extracting section 80 checks if lines having a vector substantially orthogonal to the hypothetical lines exist both above and below said lines (i.e., in the positions corresponding to the boundary line between the face and the hairs on the head) and below said lines [i.e., in the positions corresponding to the boundary line between the face and the body (neck and shoulders)]. If any such lines exist, the face contour/circular shape extracting section 80, optionally counting in the previously evaluated similarity in rotation symmetry, concludes that the hypothetical lines actually form both sides of the human face.

Subsequently, the face contour/circular shape extracting section 80 extracts an elliptical shape having the already determined aspect ratio from the region surrounded with said lines and designates the extracted elliptical shape as a candidate face region.

The synthesis/result evaluating section 82 synthesizes the candidate face regions extracted with the skin color/circular shape extracting section 78 and the face contour/circular shape extracting section 80 and checks from the composite (candidate) face region to see if the result of face extractions is appropriate or not.

In the illustrated case, two face extractions of different characteristics are performed to synthesize face regions and evaluate the result of face extractions. This is not the sole case of the invention and three or more face extractions of different characteristics may be performed to synthesize face regions and evaluate the result of face extractions.

Figure 5:
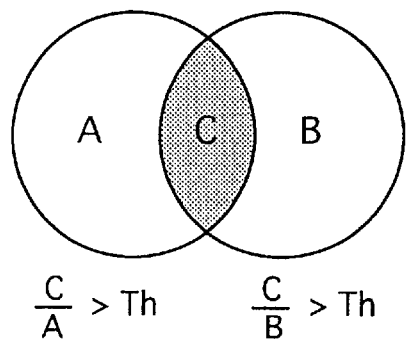
FIG. 5 is a sketch for illustrating an example of the method for evaluating the result of extractions in the extracting site shown in FIG. 4.

One method of evaluation to be performed by the synthesis/result evaluating section 82 is shown in FIG. 5. The area of region C which is an overlap between the region A extracted by the skin color/circular shape extracting section 78 and the region B extracted by the face contour/circular shape extracting section 80 is determined; if both area ratios C/A and C/B exceed a specified threshold (Th), the result of face extractions is found to be appropriate; otherwise, the result is found not appropriate.

Another method of evaluation to be performed with the synthesis/result evaluating section 82 is by weighting the extracted regions by reliability depending upon the method of extraction or the like and evaluating the total weighted scores. Referring again to FIG. 5, each of the pixels in the region A extracted with the skin color/circular shape extracting section 78 is weighted by a score of one, each of the pixels in the region B extracted with the face contour/circular shape extracting section 80 is weighted by a score of two, and each of the pixels in the region C which is an overlap between the two regions is weighted by a score of three and the total weighted scores are calculated for the three regions A, B and C; if they exceed a certain threshold, the result of face extractions is found to be appropriate; otherwise, the result is found not appropriate.

If desired, the two methods of evaluation (one by comparing the overlap ratios with a threshold and the other by comparing the total weighted scores with a threshold) may be performed in the synthesis/result evaluating section 82 and the result of face extractions is found to be appropriate if the results of both evaluations or the result of either one evaluation is found to be appropriate.

The criteria (thresholds in the case described above) for evaluating the result of face extractions in the synthesis/result evaluating section 82 may be changed depending on the need. Consider, for example, a close-up of the human face and other images that are believed to be occupied by an extensive area of a principal part (which may be evaluated by the aforementioned area of skin color) or a scene shot with an electronic flash; in order to reproduce high-quality images, face extraction is preferably performed with high precision and, hence, more strict criteria for evaluation may be adopted. Alternatively, criteria for evaluation may be varied stepwise depending on the area of skin color and the like. Conversely, in the case of ordinary portraits and the like, the face region to be extracted may drop if too strict criteria are adopted; to avoid this problem, less strict criteria may be adopted.

The criteria for evaluation may be adjusted by the extracting site 72A (particularly by the synthesis/result evaluating section 82) in accordance with the result of image (data) analysis or the operator may enter a suitable command at his or her own discretion. In the case of a film of the Advanced Photo System, the magnetic information it has recorded may be used to check the status of the scene of the image (e.g. if it was shot with an electronic flash) so that a suitable adjustment can be made.

If the result of extraction is found to be appropriate in the synthesis/result evaluating section 82, the composite face region (or the information about it) is sent to the principal part identifying section 88 so that the principal part of the image is identified. The method of identifying the principal image part (the principal image subject) in the principal part identifying section 88 is not limited in any particular way. In one exemplary method, all regions extracted in the skin color/circular shape extracting section 78 and the face contour/circular shape extracting section 80 may be identified as the principal part. Alternatively, an overlap between the results of extraction in the two sections may be identified as the principal part.

The information about the principal part of the image (the region of the principal part) identified by the principal part identifying section 88 is supplied to the setting site 72B.

If the result of extraction is found not appropriate in the synthesis/result evaluating section 82, two auxiliary image subject extraction are performed in the body/eye extracting section 86, one being face extraction by body and circular shape extractions and the other being face extraction by eye and circular shape extractions.

The auxiliary image subject extractions to be performed if the result of extracting the composite face in the synthesis/result evaluating section 82 is found not appropriate are by no means limited to two and either one or more than two face extractions may be performed.

As mentioned in connection with the prior art, the precision of face extraction can be improved by combining many methods of extracting image subjects but this involves prolonged calculation and image processing times, thereby lowering the efficiency of face extraction.

By contrast, according to the method of the invention for extracting principal image subjects, a plurality of subject extractions having different characteristics are first performed in combination and this is sufficient to perform reasonably precise and yet highly efficient extraction of the principal subject from ordinary images. Only in the case where reasonable precision cannot be assured depending on the state of the image or the like, other subject extractions are additionally employed to extract the principal image subject in a higher precision.

Hence, according to the present invention, the principal image subject can be extracted in high efficiency and yet with reasonably high precision. In particular, face extraction that employs skin color/circular shape extractions in combination with face contour/circular shape extractions in the manner already described above requires only low resolution and comparatively simple image analysis and yet comparatively high precision is ensured. Given ordinary images, the combination of the two extraction methods described above is sufficient to accomplish reasonably precise face extraction which, hence, is suitable as the face extraction to be performed at a preliminary stage.

In the body/eye extracting section 86, face extraction by face's internal structure extraction including eye extraction and circular shape extractions may typically be performed in the following manner. First, as in the aforementioned case of face contour extraction, the image is binarized and divided into a white and a black region and the contours of both regions are traced. Then, from the lines of the traced contours, a set of lines that are spaced apart by near distant end points and that form angles within a specified range are extracted as a set of lines that can form one side of the body contour extending from the neck of the body to a shoulder and from the shoulder to an arm or the lower part of the body.

Subsequently, two adjacent lines are extended until they connect each other, thereby generating lines that are each a candidate for one side of the body contour (candidate one-side line), and a line that can potentially pair with each candidate one-side line to form the body contour (said line is hereunder referred to as a "symmetric line") is extracted. A criterion for this extraction step may be the presence or absence of the possibility of forming a concave that faces the candidate one-side line. In a further step, an axis of rotation symmetry between each candidate one-side line and a symmetrical line is set and a check is made to see if the angle the two lines form with the axis of rotation symmetry is within a specified range. Based on the results of these checks, the operator extracts sets of candidate one-side lines and symmetrical lines that are recognized to represent the body contour.

Finally, on the basis of the positions of the obtained candidate one-side lines and symmetrical lines for the body contour, their dimensions and distances, as well as the direction of the axis of rotation symmetry, the operator extracts a region that is estimated to form an elliptical shape corresponding to the face of the person having the body contour and designates it as a candidate face region.

In the body/eye extracting section 86, face extraction by extraction of the internal structure of the face including eye extraction and circular shape extraction may typically be performed in the following manner. First, as in the aforementioned case of face contour extraction, the image is binarized and divided into a white and a black region. A black elliptical region having a major to minor axis ratio in a specified range that is determined from common human eyes is extracted as a region that may potentially correspond to an eye in the face (said region is hereunder referred to as a "candidate eye region"). Subsequently, the angle of the major axis of the extracted candidate eye region is determined and a black elliptical region having a differential major axis angle within a specified range is determined and extracted as a candidate eye region that pairs with the previously extracted candidate eye region.

For the pair of the thus extracted candidate eye regions, an axis of rotation symmetry perpendicular to the line connecting the centers of the two candidate eye regions is set and the similarity in rotation symmetry is evaluated; on the basis of the evaluated similarity in rotation symmetry, black regions estimated to represent the human eyes are extracted.

Finally, on the basis of the positions of the extracted black regions that are estimated to represent the human eyes, their sizes and the direction of the axis of rotation symmetry, the operator extracts a region that is estimated to form an elliptical shape corresponding to the face of the person having the eyes in those black regions and designates it as a candidate face region.

An eye is preferably extracted as the internal structure of the face. This is not however the sole case of the invention and a mouth, a nose or an ear may be extracted instead of the eye.

The result of extraction of the face region in the body/eye extracting section 86 is sent to the principal part identifying section 88 together with the face region synthesized in the aforementioned synthesis/result evaluating section 82.

In the principal part identifying section 88, the face region synthesized in the synthesis/result evaluating section 82 is composited both with the face region extracted in the body/eye extracting section 86 by eye and circular shape extractions and with the face region also extracted in the section 86 by body and circular shape extractions and a region satisfying a specified criterion is identified as the face region of the image, with the relevant information being supplied to the setting site 72B. While various methods may be employed to identify the face region, two typical methods are mentioned below: a plurality of extraction methods are performed and only the overlap of the regions extracted by those methods is identified as the face region; different weights are set for all methods of extraction and a region of the pixels having total scores exceeding a specified point is identified as the face region.

If desired, the same procedure may be followed as in the case of the aforementioned synthesis/result evaluating section 82; the face regions extracted by all extraction methods are assembled and the result of the extractions is checked for their appropriateness and only in the case where they are found appropriate, the extracted region is identified as the face region. If the result of the extractions is found not appropriate, the necessary provisions such as the setting of image processing conditions without face extraction and recapturing of the image may be performed.

The foregoing are not the sole examples of the methods of extracting image subjects in the present invention and other methods that can be used with advantage include the extraction of hairs on the head and the extraction of the non-background. The results of these extractions are preferred examples of auxiliary information that can be used in auxiliary subject extraction or face extraction.

The following is one example of the method of extracting hairs on the head. First, as in the aforementioned case of face contour extraction, the image is binarized and divided into a white and a black region. The contour of the black region is then traced and the curvature of the contour is calculated. Subsequently, on the basis of the calculated curvature, a black region is extracted that has both a convex presumably corresponding to the top of the human head and a concave presumably corresponding to the boundary between the face and the hairs on the head. The operator then calculates the characteristic quantities, say, the curvatures of circle, of the concave and the convex of the extracted black region. Using the calculated curvatures of circle and based on the degrees of curvature of circle, the proportions of the concave and the convex relative to the circumference of the contour, its position and direction and so forth, the operator extracts a contour that is estimated to represent the human head with hairs, extracts a region that is estimated to form an elliptical shape corresponding to the face of the person having that head with hairs, and designates it as a candidate face region.

The following is one example of the method of extracting the non-background. First, as in the aforementioned case of face contour extraction, the image is binarized and divided into a white and a black region and the contours of the two regions are traced. The proportions of straight lines in each contour are then calculated and regions having higher proportions of straight lines than a specified value are given weight coefficients. Subsequently, an axis of rotation symmetry extending vertically through the image is set for each contour, the degree of rotation symmetry is calculated and regions having lower degrees of rotation symmetry than a specified value are given weight coefficients. Then, the percentage of contact between each contour and the perimeter of the image is calculated and regions having higher percentages of contact than a specified value are given weight coefficients. Subsequently, the density contrast in each region is calculated and regions -having lower contrasts than a specified value are given negative weight coefficients. Further, the density value for the interior of each region is differentiated in different specified directions and those regions in which either one of the derivatives taken in the specified directions varies periodically, namely, those regions the density of which varies in a specified pattern or in which the change in a specified pattern is repeated are given weight coefficients.

The regions given weight coefficients in the procedure described above have a small probability that they represent an individual human and those regions which have higher weight coefficients than a specified value may well be judged to correspond to the background of the image and can be utilized in face extraction.

The aforementioned methods of extracting image subjects are described in detail in commonly assigned Unexamined Published Japanese Patent Application (kokai) No. 184925/1996 and so forth.

Other various known methods of extracting image subjects may be employed in the present invention and several examples are described in the following patents: Unexamined Published Japanese Patent Application (kokai) Nos. 346332/1992, 346333/1992, 346334/1992, 100328/1993, 158164/1993, 165119/1993, 165120/1993, 67320/1994, 160992/1994, 160993/1994, 160994/1994, 160995/1994, 122944/1996, 80652/1997, 101579/1997, 138470/1997 and 138471/1997.

As already mentioned, the precision of face extraction by conventional methods of extracting image subjects tends to decrease when the image of interest was taken with an electronic flash or backlight. In addition, the image quality resulting from erroneous extraction is more adversely affected than in the ordinary case. Hence, it is preferred to perform face extraction in high precision.

Under these circumstances, the method of the invention for extracting principal image subjects is preferably implemented in such a way that even in the case where the result of extractions is found to be appropriate in the aforementioned synthesis/result evaluating section 82 and where the principal part of the image is identified in the principal part identifying section 88 using the face region synthesized in the section 82, auxiliary subject extractions are performed in the body/eye extracting section 86 and so forth and the results of such extractions are used as additional information in identifying the principal part in one of the following three cases: i) an image characteristic quantity of the identified principal part is outside a specified range; ii) the image density of the principal part exceeds a specified range; iii) the difference between the image density of the principal part and the average of the overall image density exceeds a specified range.

Similarly, even in the case where the result of extractions is found to be appropriate in the synthesis/result evaluating section 82 and where the principal part of the image is identified in the principal part identifying section 88 using the synthesized face region, auxiliary subject extractions are preferably performed in the body/eye extracting section 86 and so forth, with the results of such extractions being used as additional information in identifying the principal part if more than one region is identified as a principal part and if the densities of the respective principal parts differ by more than a specified value.

If, as in shooting with an electronic flash, significant density differences occur between dark and light areas and if a principal part is extracted from both the light and dark areas, a simple mean of the two principal parts is usually taken to set the image processing conditions. However, in a case like this, it is by no means infrequent that only the extraction from either the light area or the dark area is appropriate and the image quality is adversely affected by erroneous extraction of the principal part. To avoid this problem, it is preferred to perform highly precise face extraction by effecting auxiliary subject extractions in the case just described above.

The extracting site 72A of the setup subsection 72 which is shown in FIG. 4 as a specific example of the device of the invention for extracting principal image subjects implementing the method for extracting principal image subjects according to the invention is basically composed as described above. The invention is not however limited thereto, and another device for extracting principal image subjects which is composed as shown in FIGS. 6 and 7 may be applied to the extracting site 72A.

Figure 6:
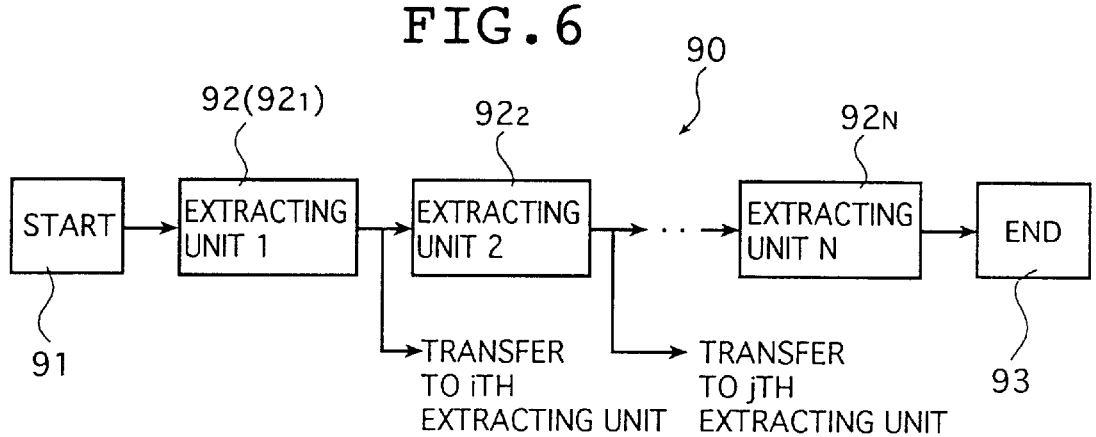
FIG. 6 is a block diagram of an embodiment of the device of the invention for extracting principal image subjects which is applied to the extracting site of the image processing apparatus shown in FIG. 3.
Figure 7:
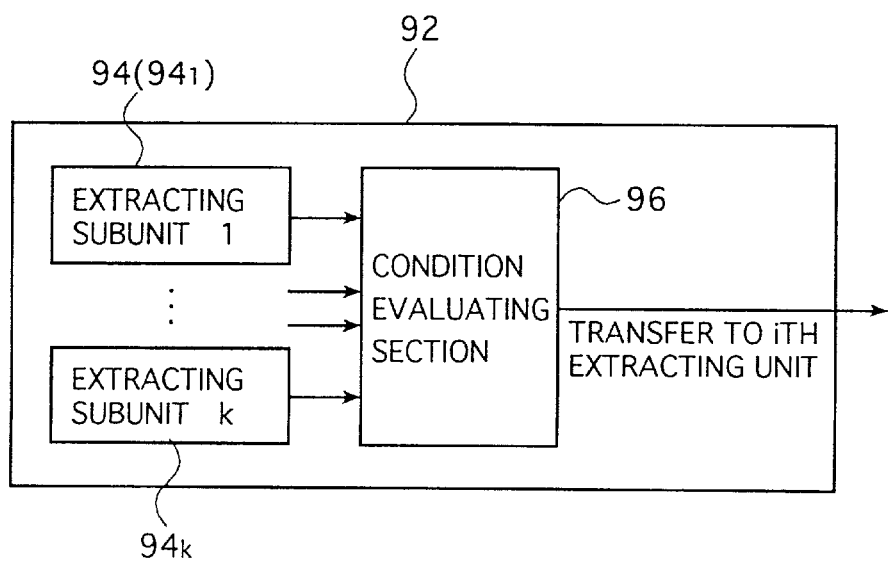
FIG. 7 is a block diagram of an exemplary extracting unit in the device of the invention for extracting principal image subjects shown in FIG. 6.

A device for extracting principal image subjects 90 constituting the extracting site 72A as shown in FIG. 6 comprises a start unit 91, cascaded N extracting units 92 ($92_1$, $92_2$, . . . $92_N$) (where N is an integer of 1 or more), and an end unit 93.

The start unit 91 is a site where the prescanned data is captured from the prescan memory 52 and necessary image data is delivered to the subsequent N extracting units 92 in order to start various algorithms for subject extraction. The end unit 93 is a site where information about the principal subjects obtained by implementing the method for extracting principal image subjects according to the invention is acquired and sent to the setting site 72B of the setup subsection 72.

The extracting units 92 are sites for extracting principal image subjects. The extracting method and the subject to be extracted are not limited in any particular way, and various principal image subjects can be extracted as required. The respective extracting units $92_1$, $92_2$, . . . $92_N$ must be cascaded to each other, but the principal image subjects are preferably extracted by means of different algorithms for subject extraction.

Each of the extracting units 92 comprises Mn extracting subunits 94 ($94_1$, . . . $94_k$) (in the illustrated case, Mn=k where k is an integer of not less than 0) which are processed in parallel and which perform subject extractions having different characteristics, and a condition evaluating section 96 which evaluates the conditions for the subject extractions on the basis of the results in the respective extracting subunits 94. It should be however noted that the number Mn of the extracting subunits 94 in each of the extracting units 92 denotes the number of the extracting subunits in the nth extracting unit $92_n$, and may be different for each of the extracting units 92, as far as Mn is an integer of not less than 0. That is, among the extracting units 92 must be included at least one unit which has more than one extracting subunit 94 processed in parallel and the condition evaluating section 96 which evaluates the conditions for the subject extractions on the basis of the results in the respective extracting subunits 94. However, among the extracting units 92 may be included at least one unit which has only one extracting subunit 94, at least one unit which has one extracting subunit 94 and the condition evaluating section 96, or at least one unit which has no extracting subunits but only the condition evaluating section 96 which evaluates the conditions for the extracted subjects on the basis of the results in the cascaded precedent extracting unit 92.

The extracting subunits 94 are not limited in any particular way, if the subject extractions having different characteristics are performed. Any method or algorithm may be applied, or any subject may be extracted. When extracting a human face as the principal subject or part, examples of the extracting subunits 94 can include a skin color extracting section, a face contour extracting section, a circular shape extracting section, a body extracting section, an eye or face's internal structure extracting section, a hairs-on-head extracting section and a non-background extracting section, as well as an extracting section for performing at least two of a skin color extraction, a face contour extraction, a circular shape extraction, a body extraction, an eye or face's internal structure extraction, a hairs-on-head extraction and non-background extraction. The extracting unit 92 includes preferably at least two subunits selected from those as described above.

As in the extracting site 72A shown in FIG. 4, one of the extracting units 92 may have the skin color/circular shape extracting section 78 and the face contour/circular shape extracting section 86 as the extracting subunits, and another extracting unit may have the body/eye extracting section 86 as the only one extracting subunit. According to the present invention, each of the skin color/circular shape extracting section 78, the face contour/circular shape extracting section 80 and the body/eye extracting section 86 which perform two extracting processes or algorithms may be used as one extracting subunit, as shown in FIG. 4. Each of the skin color extracting section, the face contour extracting section, the circular shape extracting section, the body extracting section, the eye extracting section, the face's internal structure extracting section, the hairs-on-head extracting section and the non-background extracting section which perform one extracting process or algorithm may of course be used as one extracting subunit. Alternatively, at least two extracting subunits such as the skin color extracting section, the face contour extracting section and the circular shape extracting section which perform the extraction process of principal image subjects are preferably processed in parallel in the same extracting unit located in the most possible upstream side. On the other hand, at least two extracting subunits such as the hairs-on-head extracting section, the eye extracting section, the face's internal structure extracting section, the body extracting section, the non-background extracting section and the circular shape extracting section which perform auxiliary image subject extraction processes are preferably processed in parallel in the same extracting unit located downstream of the extracting unit which performs the extraction process of principal image subjects.

In the above case, extracting sections that perform different extracting processes or algorithms are cited as typical examples of a plurality of extracting subunits. The invention is not however limited thereto, and a plurality of extracting sections which apply the same algorithm but of which the image resolutions are different from each other may be used to perform subject extractions having different characteristics.

The condition evaluating section 96 judges whether each of the candidate subjects extracted by the extracting subunits 94 ($94_1$, . . . $94_k$) is appropriate as the principal part or principal subject, and/or performs weighting on the respective extraction regions of the respective subjects judged to be especially appropriate, and also selects at least one extracting unit 92 which is located subsequently or downstream and to which the evaluation results or weighting results are to be transferred, that is, to which the extraction processing is applied based on the results thereof. In the case shown in FIG. 7, the condition evaluating section 96 selects the transfer to the ith extracting unit 92. Thus, the plurality of cascaded extracting units 92 can be transferred not only to the subsequent extracting unit 92 but also an extracting unit 92 located downstream. In the case shown in FIG. 6, the extracting units $92_1$ and $92_2$ select the transfer to the ith and jth extracting units 92, respectively. The condition evaluating section 96 in the last one of the cascaded extracting units 92 is preferably a principal image subject evaluating section for finally extracting principal image subjects.

It should be noted that the condition evaluating section 96 may perform any evaluation, weighting or selection of a downstream extracting unit, as far as the section 96 performs weighting of the respective subjects extracted by the respective extracting subunits 94 on those extracting regions, or evaluation of the appropriateness of the respective candidate subjects, together with selection of at least one downstream extracting unit 92 to which the results thereof are to be transferred. Alternatively, the operator may participate in evaluating the conditions in the condition evaluating section 96.

In the extracting site 72A shown in FIG. 4, the condition evaluating section can be exemplified by the synthesis/result evaluating section 82 which synthesizes candidate subjects having different characteristics as extracted in the skin color/circular shape extracting section 78 and the face contour/circular shape extracting section 80 served as a plurality of extracting subunits processed in parallel, and which judges whether the results of the subject extraction are appropriate or not on the basis of the extracting regions of the synthesized candidate subjects, and the principal part identifying section 88 for finally identifying the principal part of the image or the principal image subjects. The principal part identifying section 88 can be an example of the condition evaluating section in the last extracting unit 92 which has no extracting subunits.

The device of the invention for extracting principal image subjects which implements the method of the invention for extracting principal image subjects as applied to the extracting site 72A of the setup subsection 72 is basically composed as described above.

Also, the method of the invention for extracting principal image subjects can be implemented by the device for extracting principal image subjects shown in FIGS. 6 and 7. In the method for extracting principal image subjects implemented here, the cascaded extracting units $92_1, 92_2, \ldots 92_N$ described above implement extracting steps described above, respectively. The extracting results of the respective extracting units 92 are applied to at least one of cascaded downstream extracting steps successively. Respective extracting substeps described above are processed in parallel in the respective extracting subunits $94_1, \ldots 94_k$ described above of each extracting unit 92. Then, the condition evaluating section 96 of this extracting unit 92 performs a condition evaluating substep such as the evaluation and/or the weighting of the extracting regions extracted in the respective extracting substeps, and the selection of the downstream extracting units to which these results are applied. Since the respective extracting steps, the respective extracting substeps and condition evaluating substep which are implemented in the respective extracting units 92, the respective extracting subunits 94 and the condition evaluating section 96, respectively, are described above in detail, therefore, detailed description with respect to the steps and the substeps is omitted.

In the method of the invention for extracting principal image subjects as described above, overall processing steps can be constituted by software processings or by hardware processings comprising all processing units which implement all processing steps as the device of the invention for extracting principal image subjects, or by mixture of the software processings and the hardware processings by using properly whether each processing step is implemented by the software processing or the hardware processing composed of the units.

The setting site 72B of the setup subsection 72 reads the prescanned data from the prescan memory 52, and on the basis of the acquired prescanned data, constructs density histograms and calculates image characteristic quantities such as average density, highlights (minimum density) and shadows (maximum density) to determine the reading conditions for fine scan; in addition to the density histograms and the image characteristic quantities, the setting site 72B is based on the principal part of the image extracted by the extracting site 72A and responds to an optionally entered operator command or the like, thereby constructing LUTs for performing gray balance adjustment, tonal correction and density adjustment, constructing MTX operational formulae for performing saturation correction, calculating coefficients for sharpness correction and the otherwise setting conditions for the various image processing schemes and steps to be implemented in the prescanned image processing section 56 and the fine scanned image processing section 58.

The key correcting subsection 74 calculates the amounts of adjustment of image processing conditions typically in accordance with various commands entered by means of keys for adjusting the density (brightness), color, contrast, sharpness, saturation and so forth that have been set in the keyboard 18a or by the mouse 18b; the key correcting subsection 74 then supplies the calculated amounts of adjustment into the parameter coordinating subsection 76.

After receiving the image processing conditions that have been set by the setting site 72B, the parameter coordinating subsection 76 sets them in the prescanned image processing section 56 and the fine scanned image processing section 58. Further, in accordance with the amounts of adjustment calculated by the key correcting subsection 74, the parameter coordinating subsection 76 either corrects (adjusts) the image processing conditions set in various parts or makes another setting of image processing conditions.

We now describe the operations of the digital photoprinter 10, the scanner 12 and the processing apparatus 14 which implements the first aspect of the invention.

At the request of the photographer, the operator loads the scanner 12 with a carrier 30 that is associated with the film F, sets the film F (or its cartridge to be more exact) in a specified position on the carrier 30, enters the necessary information such as the size of the prints to be prepared, and thereafter keys in a command for starting print preparation.

In response to the START command, the stop-down value of the variable diaphragm 24 in the scanner 12 and the storage time of the image sensor (line CCD sensors) 34 are set in accordance with the reading conditions for prescan; thereafter, the carrier 30 unwinds the film F from the cartridge and transports it in the auxiliary scanning direction at a specified speed to start prescan; as already mentioned, the film F is subjected to slit scan in the specified reading position and the projected light is focused on the image sensor 34 so that the image recorded on the film F is captured photoelectrically as R, G and B separations.

During the transport of the film F, the magnetic information recorded in the magnetic recording media are read and bar codes such as DX code are read with the code reader 44, whereupon the necessary information is sent to a specified site.

In the present invention, both prescan and fine scan may be performed frame by frame. Alternatively, all frames may successively be subjected to prescan and fine scan. If desired, prescan and fine scan may continuously be performed on frame groups each consisting of a given number of frames. On the pages that follow, the case of reading the image in one frame is described for the sake of simplicity.

The output signals produced from the image sensor 34 by prescan are amplified by the amplifier 36 and sent to the A/D converter 38, where they are converted to digital form. The digital signals are sent to the processing apparatus 14, where they are given specified data processing steps in the data processing section 48 and converted to prescanned data (digital image data) in the log converter 50, with the prescanned data being then stored in the prescan memory 52.

The setup subsection 72 in the condition setting section 60 reads the stored prescanned data out of the prescan memory 52 and supplies it to the extracting site 72A and the setting site 72B.

In the extracting site 72A, the method for extracting principal image subjects according to the first aspect of the invention is performed in the manner already described above. Stated more specifically, a face candidate region is extracted in each of the skin color/circular shape extracting section 78 and the face contour/circular shape extracting section 80; the candidate face regions extracted in the two sections are assembled in the synthesis/result evaluating section 82 and the result of extractions is evaluated; if the result is appropriate, the switching section 84 connects to the principal part identifying section 88, where the principal part is identified and the information on the identified principal part is sent to the setting site 72B. If, on the other hand, the result of extractions is found not appropriate in the synthesis/result evaluating section 82, the switching section 84 connects to the body/eye extracting section 86, which is supplied with the result of synthesis and relevant image data to perform an additional face extraction using body and eye extractions; the result of extraction is sent to the principal part identifying section 88, where the principal part is identified and the information on the identified principal part is sent to the setting site 72B.

Based on the prescanned data, the setting site 72B constructs density histograms of the image, calculates image characteristic quantities such as highlights and shadows and performs any other necessary operations to set the reading conditions for fine scan, which are then supplied to the scanner 12. In addition to the construction of density histograms and the calculation of image characteristic quantities, the setting site 72B, in response to the principal part extracted by the extracting site 72A and commands optionally entered by the operator, sets the conditions for the image processing steps to be done in the processing subsection 66 and sends them to the parameter coordinating subsection 76.

Upon receiving the image processing conditions, the parameter coordinating subsection 76 sets them at a specified site (hardware) in the prescanned image processing section 56 and the fine scanned image processing section 58.

If verification is to be performed, the processing subsection 62 reads the prescanned data from the prescan memory 52, processes it and subsequently converts the processed data to a suitable form in the image data converting subsection 64. The converted data is represented as a simulated image on the display 20.

Looking at the representation on the display 20, the operator checks (verifies) the image, or the result of the processing and, if necessary, manipulates the aforementioned keys on the keyboard 18a or the mouse 18b to adjust the color, density, gradation and other features of the image.

The inputs for this adjustment are sent to the key correcting subsection 74 which, in response to the entered inputs for adjustment, calculates the amounts of correction of the image processing conditions and sends them to the parameter coordinating subsection 76. In response to the supplied amounts of correction, the parameter coordinating subsection 76 corrects the LUTs, MTXs and other conditions in the processing subsections 62 and 66 as already described above. The image represented on the display 20 also varies in response to this corrective measure, or the inputs for adjustment entered by the operator.

If the operator concludes that the image in the frame of interest represented on the display is appropriate (verification OK), he or she manipulates the keyboard 18a or the mouse 18b to give a command for print start, whereupon the image processing conditions are finalized and set in the scanner 12 in accordance with the reading conditions for fine scan including the stop-down value of the variable diaphragm 24 and, at the same time, carrier 30 transports the film F at a suitable speed, whereby fine scan gets started.

If no image verification is to be performed, the image processing conditions are finalized at the point of time when the parameter coordinating subsection 76 ends setting of the image processing conditions in the fine scanned image processing section 58, whereby fine scan gets started.

Fine scan is performed in essentially the same manner as prescan except that the reading conditions are those for fine scan including the stop-down value of the variable diaphragm 24; the output signals from the image sensor 34 are amplified with the amplifier 36, converted to digital form in the A/D converter 38, processed by the data processing section 48 in the processing apparatus 14, converted to fine scanned data in the log converter 50 and sent to the fine scan memory 54.

The fine scanned data being sent to the fine scan memory 54 is read by means of the fine scanned image processing section 58, processed under the image processing conditions finalized in the processing subsection 66 and subsequently converted to output image data in the image data converting subsection 68 before it is sent to the printer 16.

The printer 16 is the combination of a printer (exposing device) that records a latent image on a light-sensitive material (photographic paper) by exposing it in accordance with the supplied image data and a processor (developing device) that performs specified processing steps on the exposed light-sensitive material and which outputs it as a print. To give one example of the printer's operation, the light-sensitive material is cut to a specified length in accordance with the size of the final print; thereafter, the printer records a back print and three light beams for exposure to red (R), green (G) and blue (B) in accordance with the spectral sensitivity characteristics of the light-sensitive material are modulated in accordance with the image data outputted from the processing apparatus 14; the three modulated light beams are deflected in the main scanning direction while, at the same time, the light-sensitive material is transported in the auxiliary scanning direction perpendicular to the main scanning direction so as to record a latent image by two-dimensional scan exposure with said light beams. The latent image bearing light-sensitive material is then supplied to the processor. Receiving the light-sensitive material, the processor performs a wet development process comprising color development, bleach-fixing and rinsing; the thus processed light-sensitive material is dried to produce a print; a plurality of prints thus produced are sorted and stacked in specified units, say, one roll of film.

In the case described above, we mentioned to extract a human face as the principal part. The invention is not however limited thereto, and other subjects than the human face, as exemplified by an animal such as a pet or a horse, a car, a mountain or a lake may be extracted as the principal part. In this case, an extraction algorithm using a color or shape suitable for the selected principal part need be selected.

In the above case, we mentioned to extract a principal image subject in one frame. This is not however the sole case of the invention, and the analogy with the extracting region of the subject in another frame of the same film roll may be used in weighting each subject on the extracting region (area) in the condition evaluating section of the extracting unit. That is, the analogy of the extracting region of the principal image subject in the previous frame with that in the frame which is now extracted may be used to perform weighting of the principal image subject of the current frame on its extracting region. For example, a template matching-like analogy can be seen after the magnitude of the extracting region is normalized. Alternatively, a histogram of the extracting region can be taken to see the analogy of the density distribution. The image analogy can also be seen by image characteristic quantities of color or other factors. Thus, the analogy with another frame of the same film roll can be used to also shorten the operation time required for extracting principal image subjects.

As described above in detail, according to the first and second aspects of the present invention, principal image subjects can be extracted with photoprinters, both digital and analog alike, in high precision and with satisfactory efficiency in a consistent but flexible manner that is compatible with various states of original images. As a result, high-quality prints reproducing high-quality images can be produced with satisfactory efficiency.

In the next place, we describe the method of extracting principal image subjects according to the third and fourth aspects of the invention. Like the extraction method according to the first aspect of the invention, the methods according to its third and fourth aspects are implemented with the image processing apparatus 14 of FIG. 2, particularly by the setup subsection 72, in the digital photoprinter 10 of FIG. 1. In other words, the principal part extracting site 72A and the setting site 72B in the setup subsection 72 are responsible for implementing the method of extracting principal image subjects according to the third and fourth aspects of the present invention.

The extracting site 72A executes various methods (algorithms) of extracting image subjects to extract the principal part of the image which, in the illustrated case, is the face of a human individual in the image. The configurations of the extracting site 72A include but are not limited to the one shown in FIG. 4.

While the methods of extracting principal image subjects to be executed in the invention are not limited in any particular way, the following six extractions may be performed in the illustrated extracting site 72A: face extraction by skin color/circular shape extraction; face extraction by face contour/circular shape extraction; face extraction by body/circular shape extraction; face extraction by eye (face's interior structure)/circular shape extraction; face extraction by hairs on head/circular shape extraction; and background extraction. For details of these methods of extracting image subjects, reference may be had to the patents already listed above. To summarize: i) skin color/circular shape extraction involves skin color and circular shape extractions to extract the face region; ii) face contour/circular shape extraction involves both extracting the face contour by edge extraction and extracting a circular shape to extract the face region; iii) body/circular shape extraction involves both extracting the body contour by edge extraction and extracting a circular shape to extract the face region; iv) eye/circular shape extraction involves both extracting human eyes and a circular shape to extract the face region; v) hairs on head/circular shape extraction involves both extracting the hairs on the head by edge extraction and extracting a circular shape to extract the face region; and vi) background extraction uses contour extraction to extract the background behind human individuals, thereby acquiring auxiliary information such as for face extraction.

The extracting site 72A is basically designed to perform all of the methods described above for extracting image subjects and it effects face extraction on the basis of the results obtained. The setup subsection 72 which implements the method of the invention according to its third and fourth aspects is such that the state of the principal part of the image (which, as already mentioned, is the face of a human individual in the illustrated case) is classified into a plurality of types and in accordance with a particular state of the principal part of the image to be processed, the setup subsection 72 selects several of the aforementioned methods of extracting image subjects and executes them according to the suitable algorithms for extracting the principal part that have been set as appropriate for that particular state.

Handling a specified unit of images as in one roll of film or in a given number of prints to be produced at the request of the same customer, the setup subsection 72 evaluates the similarity between the image that was previously subjected to extraction of its principal part and the image that is to be subjected to extraction of its principal part. If it is concluded that the current image resembles the previous image (i.e., a similar image already exists), the former is subjected to extraction of its principal part in the extracting site 72A by the method of extraction that is associated with the state of the principal part of the similar image that was previously subjected to extraction of its principal part.

As already mentioned, in order to achieve face extraction with high precision from diverse images, the usual method of extracting the principal part of the image involves a multiple of image subject extractions in four directions, up/down and right/left, and uses the results of such extractions to perform face extraction.

According to the studies conducted by the present inventors, if the images (or scenes) in a specified unit, say, one roll of film F are similar to one another, the states of their principal parts are usually similar to one another; in addition, if the state of the principal part as exemplified by its orientation and size is known, there is no need to perform a multiple of image subject extractions in accordance with the diversity of image states and a subject extraction in accordance with the state of the principal part suffices to perform extraction with satisfactory high precision.

Therefore, according to the third and fourth aspects of the present invention, an image for which a similar image already exists can be subjected to precise extraction of its principal part with satisfactory efficiency while achieving significant decrease in calculation and other operation times. What is more, erroneous extraction that would otherwise occur if more than necessary subject extractions were performed is sufficiently reduced that the adverse effects that would result from such erroneous extraction are entirely eliminated.

The state of the principal part of the image to be classified in the invention is not limited in any particular way and may be exemplified by its size, orientation (whether it is in the upper, lower, right or left area of the image), position in the image, color distribution, density distribution and so forth. Two or more of such states may be combined in classification.

Consider first the case of classifying the state of the principal part of the image by size. In this case, the principal part of the image is classified as large size, medium size, small size and so forth in such terms as the area it occupies in the image. If the image is of a large size, it is transformed to a low (coarse) resolution (the number of pixels in the image after processing is reduced to $1/N_1$ of the number of pixels in the original image in both a vertical and a horizontal direction) and the image subject is extracted. If the image is of a medium size, its resolution is transformed an intermediate level (the number of pixels in the image after processing is reduced to $1/N_2$ of the number of pixels in the original image in both a vertical and a horizontal direction) and the image subject is extracted. If the image is of a small size, it is transformed to a high (fine) resolution (the number of pixels in the image after processing is reduced to $1/N_3$ of the number of pixels in the original image in both a vertical and a horizontal direction) and the image subject is extracted. Note that $N_1 > N_2 > N_3$.

Alternatively, the method of subject extraction by extracting contour lines may be employed as described in Unexamined Published Japanese Patent Application (Kokai) No. 138471/1997. This method of subject extraction is based on assuming varying regions of search from a reference point and the efficiency of extraction can be improved by setting different areas of search region according to the size of the principal part of the image (see FIG. 14 in the official gazette of the application, supra.)

If the state of the principal part of the image is classified by orientation (whether it is in the upper, lower, right or left area of the image), the direction of the axis of rotation symmetry for the aforementioned body extraction, eye extraction and so forth, as well as the orientations of concave and convex portions for the hairs-on-head extraction can be determined uniquely. Hence, in implementing various methods of extraction, one suffices to adopt considerably simplified settings for the selection of body and hairs-on-head candidates and for the methods of their calculation in accordance with the orientation of the principal part of the image.

If the state of the principal part of the image is classified by its position in the image, each method of subject extraction may be set in such a way that the region to be searched in each extraction is limited to the position in which the principal part is located in the image.

If the state of the principal part of the image is classified by color distribution, the definition of the color of the principal part to be searched [i.e., the setting of an area (range) in color space] can be set to be close to the color distribution in the principal part of a similar frame and this contributes to an improvement in the precision and efficiency of extraction. Take, for example, the case of face extraction (skin extraction). Assuming the shooting situation, the deviation of color tint due to the kind of light source used, cosmetics put on the skin, the difference between individuals in the color of the skin and other factors, a rather broad area of search is usually set for the skin color. In the present invention, however, the skin color area to be searched is limited to the area associated with the color tint of the skin color of a similar frame and this contributes not only to higher precision in face extraction but also to better extraction efficiency due to shorter calculation and other operation times.

If the state of the principal part of the image is classified by density distribution, the density area (range) of the principal part to be searched can be set to be close to the density of the principal part of a similar frame and this contributes to an improvement in the precision and efficiency of extraction. Take, for example, the case where a similar frame was shot with an electronic flash. By searching only an area of high (negative) density, the calculation time can be shortened and the possibility of erroneous extraction reduced in extracting the principal part having as high a density as the similar frame. In the case of a similar scene that was shot with rear light, the same result can be obtained by searching only an area of low density. In the case of an ordinary scene, only an area having a specified density associated with the density of the principal part of the similar frame is searched and this helps not only shorten the calculation time but also eliminate the chance of erroneously extracting an extremely light or dark subject, thereby improving the precision in extraction.

The similarity between two images may be evaluated in terms of at least one image characteristic quantity selected from among the average density by region of about six divisions of the image, the shape of a density histogram (as exemplified by the peak position), density distribution, highlight (minimal density), shadow (maximal density), average density and so forth.

If film F is one of the aforementioned Advanced Photo System, the various kinds of magnetically recorded information on the film such as the date of taking the picture, the presence or absence of light emission from an electronic flash when taking the picture, scene information and the select title may also be used as a means of evaluating the similarity between two images.

Image similarity may be evaluated at any site. In the illustrated case, the setting site 72B is responsible for calculating image characteristic quantities, so according to one approach, image similarity may be evaluated in the setting site 72B and the obtained information is received by the extracting site 72A, which then performs face extraction using an algorithm associated with the state of the principal part of a similar image.

For selecting the state of the principal part of the image according to the similarity between two images, the characteristic quantities (parameters for evaluating the similarity) of the processed images (or frames) in one roll of film or the like and the states of their principal parts may be stored or, alternatively, the parameters for evaluating the similarity may be stored in a specified relationship with the states of the principal parts of the processed images.

In the setup subsection 72, the result of extracting the principal part of the image may optionally be evaluated for its appropriateness. The method of evaluation is not limited in any particular way and various approaches may be adopted. Take, for example, the case of extracting a candidate face region by performing a plurality of subject extractions. All of the extracted candidate face regions are assembled and the area of the overlap between the regions extracted by all methods is determined; then, the ratio in area between the extracted region and the overlapping region is determined for each method of extraction; if the area ratio exceeds a specified threshold (Th) in all methods of extraction or in at least a specified number of extraction methods, then the result of face extraction is evaluated to be appropriate and, otherwise, the result is evaluated not appropriate.

In another method of evaluation, different weights are set in accordance with the extracted candidate face region (e.g., the candidate face region extracted by method A is given a score of one, the candidate region extracted by method B is given a score of two, and the candidate face region which is the overlap between said two regions is given a score of three) and the total score is calculated. If it exceeds a certain threshold, the result of face extraction is evaluated to be appropriate but if it is less than the threshold, the result is evaluated not appropriate.

Taking further about films of the Advanced Photo System, data on the luminance of the image subject can also be recorded as magnetic information, so the result of face extraction may be checked for its appropriateness using the luminance data for the image when it was brought to focus during shooting. For example, when taking a picture, the focus lock capability of a camera is utilized to measure the luminance of the subject with the face (principal image subject) positioned in the central area, and the luminance information is magnetically recorded on, for example, a film of the Advanced Photo System. When performing face extraction, the luminance relationship between the face region and the surrounding region and the density relationship between the extracted face region and the surrounding region are checked for the match between the two relationships; if the face region has a sufficiently higher luminance than the surrounding region and if the extracted face region has a sufficiently higher density (negative density in the case under consideration) than the surrounding region, the result of face extraction is evaluated to be appropriate.

If desired, the luminance of image subject of a similar type may be used as auxiliary information in face extraction. For example, the image is roughly divided into blocks and the density data of each block is calculated, and the density relationship between blocks of interest which presumably contain the face and the surrounding blocks and the subject luminance relationship between the blocks of interest and the surrounding blocks are investigated. If both of the density and luminance relationships are such that they can be evaluated to be appropriate by the method described above, one may safely estimate that there is high likelihood for the face to exist in the blocks of interest, so only these blocks of interest need be subjected to face extraction. As a result, the region to be subjected to extraction is significantly narrowed while the calculation and other operation times are shortened to improve the efficiency of face extraction.

If, in the presence of a previously processed similar image, face extraction is performed using parameters associated with the state of the principal part of the similar image and if the result of the extraction is evaluated to be not appropriate, the procedure for the absence of the similar image is followed and face extraction is performed by implementing all of the above-mentioned methods of extracting image subjects.

Based on the prescanned data read from the prescan memory 52, the setting site 72B in the setup subsection 72 constructs density histograms and calculates various image characteristic quantities to determine the reading conditions for fine scan. In addition to the construction of histograms and the calculation of image characteristic quantities, the setting site 72B, in response to the principal part of the image extracted by the extracting site 72A and commands optionally entered by the operator, sets the conditions for the various image processing steps to be done in the prescanned image processing section 56 and the fine scanned image processing section 58.

Further, the setting site 72B bases on the calculated image characteristic quantities and so forth to compare the similarity between the previously processed image and the current image to be processed. If there is any similar previous image, the information to that effect is sent to the extracting site 72A which, in response to that information, performs face extraction using the algorithm associated with the state of the principal part of the similar image.

If one of the images for which the image processing conditions are to be set resembles a previously processed image and if the similar previous image is such that it was subjected to adjustments by the operator, the setting site 72B preferably allows the same image adjustments to be reflected on the conditions for processing the current image of interest. Examples of the adjustments by the operator that are to be reflected on the settings of image processing conditions include color adjustment, density adjustment, correction for the light source, various enhancements such as sharpening and contrast enhancement, and red eye correction.

Having described above the configuration of the setup subsection 72 which is to implement the method of extracting the principal part of an image according to the third and fourth aspects of the invention, we now explain the operation of the setup subsection 72 and the specific procedure of extracting the principal part of an image according to these two aspects.

As already mentioned in connection with the first and second aspects of the invention, the prescanned data stored in the prescan memory 52 in the digital photoprinter 10 is read into the setup subsection 72 of the conditions setting section 60 so that it is supplied into the extracting site 72A and the setting site 72B.

First, on the basis of the prescanned data, the setting site 72B constructs density histograms of the image, calculates image characteristic quantities such as highlights and shadows and performs any other necessary operations to set the reading conditions for fine scan and supplies them to the scanner 12. In addition, on the basis of the calculated image characteristic quantities, the setting site 72B checks for any similarity between the current image and the previously processed image that resembles the current image. If there is any similar previous image, the information to that effect is sent to the extracting site 72A and if not, the characteristic quantities of the current image (i.e., parameters for evaluation of image similarity) are stored.

In the case of the first frame or if the image in that frame is not preceded by any similar image, the extracting site 72A performs face extraction by effecting all of the aforementioned subject extractions including skin color/circular shape extraction, face contour/circular shape extraction and background extraction and, in addition, the extracting site 72A stores the state of the principal part (face) of the image. On the other hand, if there is any similar previous image, the extracting site 72A reads the state of its principal part and performs face extraction using associated parameters. The result of the face extraction is sent to the setting site 72B. This is how the method of extracting the principal image subject is implemented according to the second and third aspects of the invention.

Upon receiving the result of face extraction, the setting site 72B, in consideration of that result, the constructed density histograms and the calculated image characteristic quantities, as well as the commands optionally entered by the operator, sets the conditions for image processing steps to be done in the processing subsection 66, and supplies them to the parameter coordinating subsection 76.

Upon receiving the image processing conditions, the parameter coordinating subsection 76 sets them at a specified site (hardware) in the prescanned image processing section 56 and the fine scanned image processing section 58.

The operation of the digital photoprinter 10 at subsequent stages is the same as already described above in connection with the first aspect of the invention.

As described above in detail, according to the third and fourth aspects of the present invention, principal image subjects can be extracted with photoprinters, both digital and analog alike, in high precision and with satisfactory efficiency in a consistent but flexible manner that is compatible with various states of original images. As a result, high-quality prints reproducing high-quality images can be produced with satisfactory efficiency.

While the method and device of the invention for extracting principal image subjects has been described above in detail, it should be understood that the invention is by no means limited to the aforementioned examples and that various improvements and modifications are possible without departing from the scope and spirit of the invention.

What is claimed is:

1. A method for extracting a principal image subject comprising the steps of:

performing a plurality of subject extractions having different characteristics;

synthesizing subjects extracted by the respective subject extractions; and extracting the principal image subject from a result of a synthesis if the result of said synthesis satisfies a specified criterion of judgment; but if the result of said synthesis does not satisfy the criterion of judgment, performing an auxiliary image subject extraction having a different characteristic after said synthesizing and extracting the principal image subject using the result of said synthesis and a result of extraction by said auxiliary image subject extraction.

2. The method for extracting a principal image subject according to claim 1, wherein said criterion of judgment is at least one of a degree of overlap between regions that occurs when the subjects extracted by the respective subject extractions are synthesized and a weighting score applied when the subjects extracted by the respective subject extractions are synthesized.

3. The method for extracting a principal image subject according to claim 1, wherein if, in case of extracting the principal image subject from the result of said synthesis, an image characteristic quantity of the extracted principal image subject exceeds a predetermined threshold, said auxiliary image subject extraction is performed and the principal image subject is extracted using the result of said synthesis and the result of extraction by said auxiliary image subject extraction.

4. The method for extracting a principal image subject according to claim 1, wherein if, in case of extracting the principal image subject from the result of said synthesis, a plurality of principal image subjects are extracted and if the image characteristic quantities of said plurality of principal image subjects have differences in excess of a specified level, said auxiliary image subject extraction is performed and the principal image subject is extracted using the result of extraction by said auxiliary image subject extraction.

5. The method for extracting a principal image subject according to claim 1, wherein said subject extractions are at least two operations selected from among skin color extraction, face contour extraction and circular shape extraction, and said auxiliary image subject extraction is at least one operation selected from among hairs-on-head extraction, face's internal structure extraction, body extraction, non-background extraction and circular shape extraction.

6. A device for extracting a principal image subject comprising:

a plurality of extracting units which are cascaded and at least one of which comprises:

a plurality of extracting subunits which are processed in parallel and which perform subject extractions having different characteristics; and a condition evaluating section which evaluates conditions for said subject extractions based on results in the respective extracting subunits; and wherein said condition evaluating section performs weighting on respective extracting regions of subjects extracted by said extracting subunits, and/or evaluation of appropriateness of said subjects, as well as selection of at least one of said extracting units which is located downstream and to which extraction processing is applied based on the results thereof.

7. The device for extracting a principal image subject according to claim 6, wherein said extracting units comprise at least one unit which has one extracting subunit performing one subject extraction and the condition evaluating section which evaluates the conditions for said subject extraction based on the results in the extracting subunit, or at least one unit which has no extracting subunit but only the condition evaluating section which evaluates the conditions for the extracted subjects based on the results in the cascaded precedent extracting unit.

8. The device for extracting a principal image subject according to claim 6, wherein said extracting subunits comprises at least one section selected from the group consisting of a skin color extracting section, a face contour extracting section, a circular shape extracting section, a body extracting section, an eye extracting section, a face's internal structure extracting section, a hairs-on-head extracting section and a non-background extracting section, as well as an extracting section for performing at least two of a skin color extraction, a face contour extraction, a circular shape extraction, a body extraction, an eye extraction, a face's internal structure extraction, a hairs-on-head extraction and non-background extraction.

9. The device for extracting a principal image subject according to claim 6, wherein said condition evaluating section comprises a synthesis/result evaluating section which synthesizes candidate subjects having different characteristics as extracted in the plurality of extracting subunits processed in parallel, and which judges whether the results of the subject extractions are appropriate or not based on the extracting regions of said synthesized candidate subjects.

10. The device for extracting a principal image subject according to claim 6, wherein the condition evaluating section in the last one of the cascaded extracting units is a principal image subject evaluating section for extracting the principal image subject.

11. A method for extracting a principal image subject, comprising:

a plurality of extracting steps which are cascaded, at least one of said plurality of extracting steps comprising:

a plurality of extracting substeps processed in parallel for performing subject extractions having different characteristics; and a condition evaluating substep for evaluating conditions for said subject extractions based on results in the respective extracting substeps; and wherein said condition evaluating substep is performing weighting on respective extracting regions of subjects extracted in said extracting substeps, and/or evaluation of appropriateness of said subjects, as well as selection of at least one of said extracting steps which is located downstream and to which extraction processing is applied based on the results thereof.

12. The method for extracting a principal image subject according to claim 11, wherein said plurality of extracting steps contain at least one step which has one extracting substep performing one subject extraction and the condition evaluating substep which evaluates the conditions for said subject extraction based on the results in the extracting substep, or at least one step which has no extracting substep but only the condition evaluating substep which evaluates the conditions for the extracted subjects based on the results in the cascaded precedent extracting step.

13. The method for extracting a principal image subject according to claim 11, wherein said extracting substeps comprises at least one selected from the group consisting of skin color extracting, face contour extracting, a circular shape extracting, body extracting, eye extracting, face's internal structure extracting, hairs-on-head extracting, non-background extracting and extraction for performing at least two thereof.

14. The method for extracting a principal image subject according to claim 11, wherein said condition evaluating substep comprises synthesis/result evaluating substep synthesizing candidate subjects having different characteristics as extracted in the plurality of extracting substeps processed in parallel, and judging whether the results of the subject extractions are appropriate or not based on the extracting regions of said synthesized candidate subjects.

15. The method for extracting a principal image subject according to claim 11, wherein the condition evaluating substep in the last one of the cascaded extracting steps is a principal image subject evaluating substep for extracting the principal image subject.

16. A method of extracting a principal image subject, comprising the steps of:

preliminarily classifying a state of a principal subject in an image into a plurality of types;

setting an appropriate parameter for the extraction of the principal subject for each state of the principal subjects;

evaluating the similarity between two images; and, if similarity is found to exist between the image from which the principal subject is to be extracted and the image from which the principal subject has already been extracted, extracting the principal subject using a parameter for the extraction of the principal subject that corresponds to the state of the principal subject in the image that has already been subjected to the extraction of the principal subject.

17. The method of extracting a principal image subject according to claim 16, wherein the state of the principal subject in said image is at least one element of the group consisting of size, orientation, position in the image, color distribution and density distribution.

18. A method of extracting a principal image subject, comprising the steps of:

extracting a principal subject from an image;

using luminance data on shooting of the image to determine luminance relationship between a region containing the extracted principal subject and its surrounding region, as well as density relationship between the region containing the extracted principal subject and the surrounding region; and judging for the match between said luminance and density relationships to see if a result of extracting said principal subject is appropriate or not.

* * * * *